May 23, 1944.  A. FINCH  2,349,713
GERMICIDAL ANIMAL COLLAR
Filed March 3, 1943
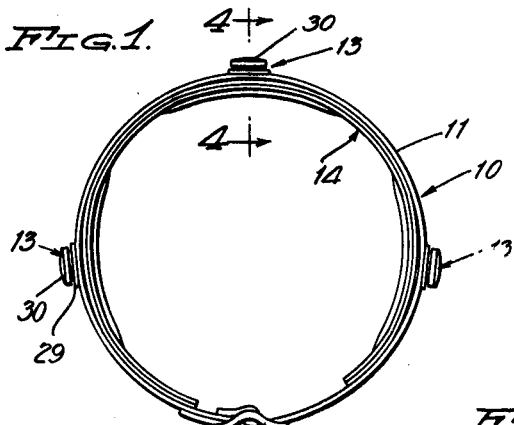
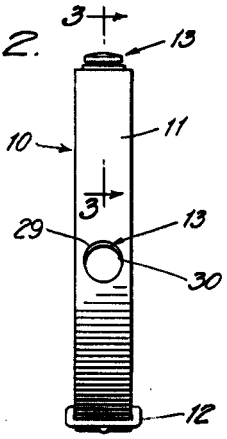
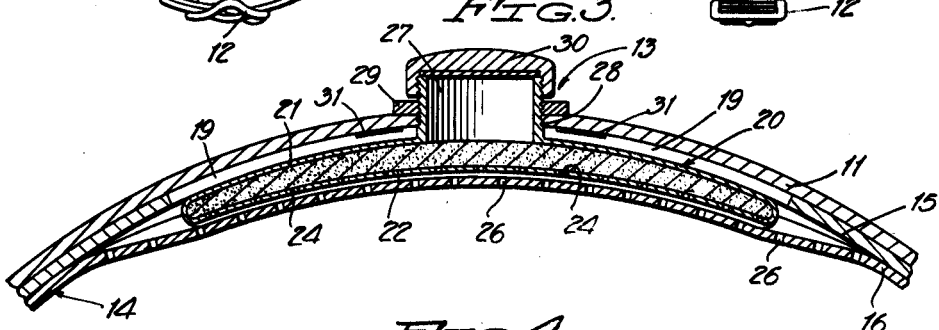
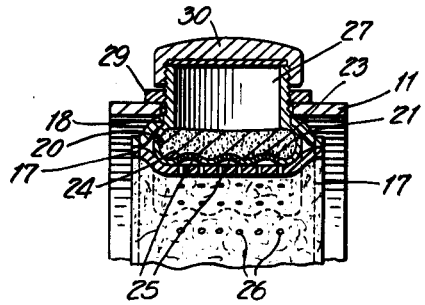
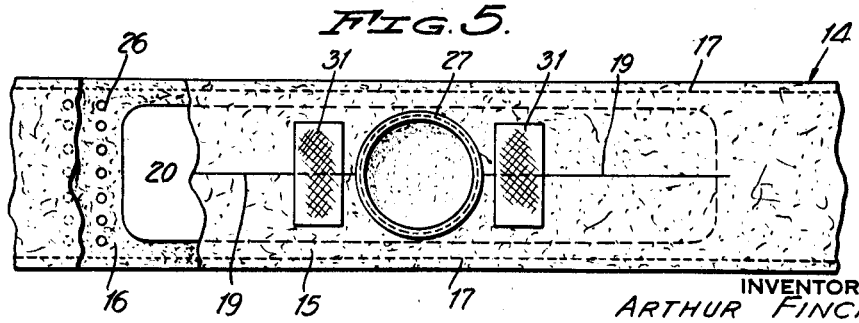
INVENTOR
ARTHUR FINCH.
BY
ATTORNEYS
WITNESS:

Patented May 23, 1944

2,349,713

UNITED STATES PATENT OFFICE 2,349,713

GERMICIDAL ANIMAL COLLAR

Arthur Finch, Bolling Field, Washington, D. C.

Application March 3, 1943, Serial No. 477,853

5 Claims. (Cl. 119—106)

This invention relates to improvements in animal collars and more specifically to an animal collar having means embodied therein for retaining a powdered substance having vermin repellant or germicidal qualities.

To apply flea powder and other vermin killing or repellant substances to parts of a dog or cat which may be licked by the animal is dangerous, for such substances in many instances contain poison and may effect the normal healthy condition of the animal. Therefore, the most logical and safest part of the animal to receive an application of a vermin repellant or killing substance is about the neck of the animal, for it cannot be reached by licking. This invention makes use of an animal collar as a carrier and disseminator of a vermin repellant or killer substance.

Another feature of the invention resides in a germicidal animal collar in which a supply of powdered vermin repellant substance is carried by the collar for dissemination about the neck of an animal by reason of the active neck movements of an animal when the collar is in use.

Another feature of the invention is to provide an animal collar in which one or more powder receptacles are carried by the collar which effects a sifting of the powder onto a porous inner pad or liner, the receptacles being accessible for refilling and the pads being separable from the collar for replacement when becoming soiled by use.

A further feature of the invention is to embody the aforementioned features in a collar for domestic animals without unduly increasing the size and weight of the collar, and which conditions would make the collar unsightly, and also uncomfortable to the animal on which it is to be worn.

Other novel features of the invention will become apparent as the following specification is read in conjunction with the accompanying drawing, in which:

Figure 1 is a front elevational view of an animal collar constructed in accordance with the invention.

Figure 2 is a side elevational view thereof.

Figure 3 is an enlarged detail vertical sectional view on the line 3—3 of Figure 2.

Figure 4 is a vertical transverse sectional view on the line 4—4 of Figure 1.

Figure 5 is a fragmentary to plan view of the pad with the filling spout of the germicidal powder container extending therethrough and a portion of the outer lamination broken away.

Referring to the drawing by reference characters, the numeral 10 designates my improved germicidal animal collar in its entirety and which includes a neck encircling strap 11 preferably made of leather and which carries the usual buckle 12 at one end thereof for receiving and securing the other end of the strap to hold the collar in annular or neck encircling position. Associated with the strap 11 is one or more germicidal powder disseminating devices 13, and in Figures 1 and 2 three of such devices are shown at spaced distances along the length of the neck encircling strap 11. A description of one of the devices 13 will suffice for the others.

Fitting against the inner side of the strap 11 is a porous laminated pad 14 which preferably comprises an outer layer of felt or other equivalent soft flexible material 15, and an inner layer of similar material 16. The layers of material 15 and 16 are stitched together adjacent their longitudinal edges as at 17. The pad 14 is of a width slightly less than the width of the strap 11 and of a length to extend substantially the length of the strap 11. The outer layer of material 15 is provided with a round opening 18 and extending from the walls of the opening 18 in a longitudinal direction, are opposed slits 19, which slits 19 and opening 18 permit of the insertion of a germicidal powder receptacle 20 into a position intermediate the layers of pad material 15 and 16. The powder receptacle 20 comprises a relatively shallow elongated body 21, which is of arcuate shape in a lengthwise direction so as to substantially conform to the curvature of the neck encircling strap 11 when the collar is applied about the neck of an animal. The bottom wall 22 of the body 21 is provided with longitudinal corrugations 23, the humps of which are provided with powder dispensing openings 24. By corrugating the bottom wall of the casing, the dispensing openings 24 are held spaced from the adjacent confronting portions of the inner layer of pad material 16 and provides longitudinal powder pockets 25 between the bottom wall of the receptacle and the layer of material 16. The inner layer of pad material 16 is provided with enlarged openings 26 which open into the pockets 25 and permits of the dissemination of the germicidal powder stored in the receptacle 20 for subsequent passage through the inner layer of pad material 16 on the neck of the animal to which the collar is applied.

Extending outwardly from the top wall of the receptacle 20 is an externally screw threaded filling spout 27 and which spout extends through the opening 18 and through an alined opening 28 provided in the strap 11. After insertion of the receptacle 20 between the plys of material 15 and 16 in the manner just explained, a clamping nut 29 is threaded to the spout 27 and screwed into clamping engagement with the strap 11. The threaded spout and the nut 29 constitutes a coupling by which the receptacle 20 and the pad 14 is removably held to the strap 11. A screw cap 30 is threaded to the outer end of the spout 27 for closing the same.

After the outer layer 15 is spread along the slits 19 to effect an insertion of the receptacle 20 between the layers of pad material 15 and 16, short strips of adhesive tape 31 may be applied to the outer side of the outer layer 15 crosswise of the slits for holding the slit portions closed.

Assuming that the receptacle 20 is filled with a germicidal or antiseptic powder substance, the collar 10 is applied about the neck of a dog, cat or other animal infested with fleas or other vermin. By reason of the neck movements of the animal, the powdered substance will sift from the body 21 of the receptacle 20 through the openings 24 and into the channels or pockets 25 from whence it is disseminated and subsequently passes through the openings 26 in the inner pad layer 16 and onto the neck of the animal. When the supply of powdered substance is depleted, the cap 30 may be removed and the receptacle refilled with powder. When the pad 14 becomes soiled from use, the same may be separated from the strap 11 by unscrewing the clamping nut 29 and pulling away of the adhesive strips 31, whereupon the receptacle 20 may be removed from its position between the layers of pad material 15 and 16 and subsequently used in association with a fresh clean pad.

Whereas I have shown and described what I consider to be the most practical embodiment of my invention, I wish it to be understood that such changes in construction and design as come within the scope of the appended claims may be resorted to if desired.

Having thus described the invention, what I claim as new and desire to secure by Letters Patent of the United States, is:

1. An animal collar comprising in combination, a flexible neck encircling strap, a flexible porous pad fitting against the inner side of said strap, a rigid germicidal powder receptacle embedded in said pad, the bottom wall of the receptacle having perforations therein, said strap having an opening therein, an externally screw threaded filling spout extending from said receptacle through said opening to the outer side of the strap, a nut threaded to said spout in clamping engagement with said strap and a removable closure attached to the outer end of said spout.

2. An animal collar as set forth in claim 1, in which the germicidal powder receptacle is of elongated shape and arcuate in a lengthwise direction, and corrugations formed in the bottom wall of said receptacle extending lengthwise thereof to provide elongated powder pockets between the bottom wall and the adjacent confronting portion of the pad to receive a powdered substance when sifted from the receptacle through the perforations in the bottom wall thereof.

3. An animal collar comprising in combination, a flexible neck encircling strap, a flexible porous laminated pad fitting against the inner side of the strap, said laminated pad comprising inner and outer layers of pad material stitched along their edges, a rigid germicidal powder receptacle interposed between the layers of the pad material, said receptacle having a perforated bottom wall, the outer layer of pad material and the strap having aligned openings therein, an externally screw threaded filling spout extending outwardly from the receptacle through said alined openings to the exterior of the strap, a nut threaded to said spout in clamping engagement with said strap and a closure cap fitted to the outer end of the spout for closing the same.

4. An animal collar comprising in combination, a flexible neck encircling strap, a flexible porous laminated pad fitting against the inner side of the strap, said laminated pad comprising inner and outer layers of pad material stitched along their edges, a rigid shallow germicidal powder receptacle of elongated shape, said receptacle being arcuate in a lengthwise direction, the bottom wall of the receptacle being provided with corrugations extending lengthwise thereof to provide elongated pockets between the bottom wall and the inner lamination, said bottom wall having perforations therein, the outer layer of pad material and strap having aligned openings therein, an externally screw threaded filling spout extending from the receptacle through the alined openings to the outer side of the strap, a clamping nut threaded to the spout in clamping engagement with the strap, and a screw cap threaded to the spout for closing the same.

5. An animal collar comprising in combination, a flexible neck encircling strap having an opening therein, a laminated porous pad freely fitting against the inner side of said strap, said pad comprising inner and outer layers of pad material stitched together adjacent their edges, the outer layer of pad material having an opening therein in registration with the opening in the strap, slits provided in the outer layer of pad material extending from said opening, a rigid shallow elongated germicidal powder receptacle, said receptacle being of arcuate shape in a lengthwise direction and having a perforated corrugated bottom wall, an externally screw threaded spout extending from said receptacle, said receptacle being inserted between the inner and outer layers of pad material by spreading the slits and opening in the outer layer of pad material with the spout extending through the opening in said outer layer of pad material and through the opening in said strap, a clamping nut threaded on said spout in clamping engagement with the strap, and a screw cap threaded to said spout for closing the same, said inner ply of pad material having openings therein for the sifting of powder therethrough after having been sifted from the receptacle through the perforated bottom wall thereof.

ARTHUR FINCH.